United States Patent [19]
Pearce et al.

[11] Patent Number: 5,828,877
[45] Date of Patent: Oct. 27, 1998

[54] CIRCUIT AND METHOD FOR OPTIMIZING CREATION OF A COMPRESSED MAIN MEMORY IMAGE

[75] Inventors: John J. Pearce, Del Valle; Charles Zeller, Austin, both of Tex.

[73] Assignee: Dell USA, L.P., Round Rock, Tex.

[21] Appl. No.: 275,163

[22] Filed: Jul. 14, 1994

[51] Int. Cl.$^6$ ................................................ G06F 12/00
[52] U.S. Cl. .................. 395/670; 395/670; 395/114; 395/750.01; 711/157; 711/218; 382/232; 382/233
[58] Field of Search .................. 395/750.01, 183.14, 395/888, 26, 497.01, 164, 114; 358/426, 404; 382/47, 232, 233; 371/11.1; 711/157

[56] References Cited

U.S. PATENT DOCUMENTS

| | | | |
|---|---|---|---|
| 4,954,951 | 9/1990 | Hyatt | 364/200 |
| 5,231,679 | 7/1993 | Matsuura et al. | 382/47 |
| 5,263,136 | 11/1993 | DeAguiar et al. | 395/164 |
| 5,337,311 | 8/1994 | Furukawa et al. | 371/11.1 |
| 5,396,343 | 3/1995 | Hanselman | 358/426 |
| 5,446,904 | 8/1995 | Belt et al. | 395/750 |
| 5,490,260 | 2/1996 | Miller et al. | 395/427 |
| 5,530,847 | 6/1996 | Schieve et al. | 395/183.14 |
| 5,574,952 | 11/1996 | Brady et al. | 395/888 |
| 5,581,736 | 12/1996 | Smith | 395/497.01 |
| 5,606,428 | 2/1997 | Hanselman | 358/404 |
| 5,617,552 | 4/1997 | Garber et al. | 395/26 |
| 5,627,995 | 5/1997 | Miller et al. | 395/497.02 |
| 5,742,814 | 4/1998 | Balasa et al. | 395/613 |

OTHER PUBLICATIONS

Byte: The User Interface (A Publication of The McGraw–Hill Companies/0360–5280); p. 106, Jul. 1997.

Primary Examiner—Meng-Ai T. An
Assistant Examiner—Eric S. Thlang
Attorney, Agent, or Firm—Haynes and Boone, L.L.P.

[57] ABSTRACT

A computer system having a central processing unit ("CPU"), a main memory divisible into allocable units, a secondary storage unit and an operating system for allocating the allocable units to tasks for use thereby is provided with a suspend circuit for creating an optimized compressed image of data in the main memory. In a first embodiment, the suspend circuit comprises: (1) a circuit for initiating execution of a reducing task on the CPU, the reducing task requesting the operating system to allocate unallocated ones of the allocable units to the reducing task, (2) a circuit for storing a bit pattern in the allocable units allocated to the reducing task, the bit pattern chosen to optimize performance of a data compression process and (3) a circuit for executing the data compression process to store a compressed image of the main memory in the secondary storage unit, the bit pattern allowing a size of the compressed image to be reduced and a time required to compress and store the compressed image to be minimized. In a second embodiment, the unallocated allocable units are neither compression-optimized, compressed nor stored. Rather, the reducing task creates a record of all allocated units and the data compression process acts on only those allocated units identified in the record.

65 Claims, 3 Drawing Sheets

CIRCUIT AND METHOD FOR OPTIMIZING CREATION OF A COMPRESSED MAIN MEMORY IMAGE

TECHNICAL FIELD OF THE INVENTION

The present invention is directed, in general, to computer systems and, more particularly, to a circuit and method for conserving power used by the computer system by storing a compressed image of the contents of the computer system's main memory on a nonvolatile secondary storage device, allowing power to the main memory to be interrupted.

BACKGROUND OF THE INVENTION

Conservation of battery power in portable computer systems, particularly personal computers ("PCs"), has been a goal of computer designers for many years. Today's computer batteries are relatively heavy and bulky and form a significant percentage of the portable PC's total weight, hampering the portability of such computers and forcing a tradeoff between battery size and PC operating time. While research continues in the quest to find batteries that are lighter or more powerful, current PCs must be designed to operate as efficiently as possible with the limited power resources current battery technology lends. Apart from battery conservation efforts in portable PCs, a growing effort to conserve natural resources and the environment in general is leading to the development of more power-efficient desktop PCs (so-called "green PCs") that embody one or more power conservation features previously found only in portable PCs to lower power consumption.

It is conventional to provide portable PCs with one or more power-saving modes of operation wherein power to some or all of the components of the PC is limited or completely interrupted upon the expiration of a period of inactivity. In such systems, it is commonplace first to interrupt power to secondary storage devices, such as the PC's hard disk drive, if the devices have not been accessed in a certain period of time. This is in recognition of the fact that a user can effectively use the PC to edit a document in a word processor, for instance, without accessing the hard disk drive. Thus, power otherwise used to spin the drive can be saved. When the PC subsequently orders an access of the drive, power is restored.

It is also well known secondly to interrupt power to lamps supplying light to the portable PC's liquid crystal display ("LCD") screen, blanking the screen when a period of time has elapsed without any keyboard activity. When the user begins to type again, power is restored.

It is further conventional to allow the user to designate the periods of time required to elapse before power is interrupted to the secondary storage devices and the screen, typically by setting software switches. This enables the user to determine whether power savings or system availability is a priority.

Although the above-detailed power-saving measures improve the operating time of the PC, they represent only the first measures some portable PCs take to save power. Some PCs slow down or completely stop the clock driving the microprocessor central processor unit ("CPU"). However, since such PCs are universally provided with dynamic random access memory ("DRAM"), power is required to maintain refresh of the DRAM.

The most effective solution to power saving following a long period of user inactivity is to turn off the PC completely. However, it is unacceptable simply to interrupt power, because the user may have been engaged in work that has not yet been stored in non-volatile memory, particularly the hard disk drive. Rather, it is advantageous to store the contents of the volatile main memory of the PC as an image in the nonvolatile secondary storage device (a so-called "suspend-to-disk" or "STD"). When the user restores power to the PC, the image is restored to the main memory (a "resume-from-disk" or "RFD"), placing the PC in exactly the same functional state as it was when power was interrupted.

Unfortunately, since PCs may have many megabytes of main memory, the time and secondary storage space required to store the image are considerable. Therefore, some prior art PCs apply one of several conventional compression routines to compress the entire main memory to form a compressed image on the secondary storage device. Compression of the main memory has somewhat improved the time and space problems. However, because the main memory frequently contains allocable units or "pages" that the operating has not allocated and thus are not in use, time and space are wasted creating and saving an image of those allocable units. Thus, this technique is inefficient and does not take advantage of the PC's resources to reduce, in effect, the amount of main memory compressed and suspended to disk.

What is needed in the art are an improved circuit and method for reducing the size of a compressed image of the PC's main memory on the secondary storage device.

SUMMARY OF THE INVENTION

To address the above-discussed deficiencies of the prior art, it is a primary object of the present invention to provide a circuit and method for, in effect, reducing a working set of the main memory to minimize the amount of main memory that actually is suspended to disk.

Accordingly, a first embodiment of the present invention provides, in a computer system having a CPU, a main memory (either real or virtual) divisible into allocable units, a secondary storage unit and an operating system for allocating the allocable units to tasks for use thereby, a suspend circuit for creating an optimized compressed image of data in the main memory. The suspend circuit comprises: (1) a circuit for initiating execution of a reducing task on the CPU, the reducing task requesting the operating system to allocate unallocated ones of the allocable units to the reducing task, (2) a circuit for storing a bit pattern in the allocable units allocated to the reducing task, the bit pattern chosen to optimize performance of a data compression process and (3) a circuit for executing the data compression process to store a compressed image of the main memory in the secondary storage unit, the bit pattern allowing a size of the compressed image to be reduced and a time required to compress and store the compressed image to be minimized. In a preferred embodiment, the circuit for storing the bit pattern is further for filling each of the units allocated to the reducing task with a repeating plurality of the bit pattern.

One of the many functions of an operating system is to grant requests for allocable units of memory by the programs that run within the framework of the operating system. Thus, if a particular task needs more memory, the task makes a request of the operating system for an allocable unit or "page" of memory to be allocated to the particular task. Assuming that there are unallocated units, the operating system makes an allocation, marking the unit as allocated to the particular task.

Operating systems that manage real memory designate allocable units as either unallocated or allocated. The present invention compression-optimizes unallocated units so as to minimize the time and secondary storage space needed to suspend the main memory to the secondary storage device. In a preferred embodiment, the secondary storage device is a conventional, nonvolatile hard disk drive.

In one embodiment of the present invention, the main memory is a virtual memory space. Operating systems that manage virtual memory spaces further designate allocated units as either read-only allocated or read-write allocated. By allocating a unit to a particular task as read-only, the operating system can re-allocate the unit at a later time with the assurance that it has not been altered and thus does not need to be written to disk. Because such read-only units do not contain data that does not already exist on disk, it is a further object of the present invention to compression-optimize any units that are designated read-only.

An alternative to the first embodiment of the present invention makes a request to the operating system to re-allocate unmodified read-write pages, and then marks the re-allocated pages as allocable. In addition, the present invention also makes a request to the operating system to re-allocate modified read-write pages, and then marks the re-allocated pages as allocable. It should be understood by one skilled in the art that such a request causes the operating system to write to disk the modified read-write pages prior to making the pages allocable. By performing such requests, the invention effectively reduces the amount of data that must be stored-to-disk, and subsequently restored to memory during a resume-from-disk operation. By reducing the amount of data to be restored, the speed of the resume-from-disk operation is improved.

In a second embodiment of the present invention, the suspend circuit comprises: (1) a circuit for initiating execution of a reducing task on the CPU, the reducing task creating a record containing identities of the allocable units allocated for use by the tasks and (2) a circuit for executing a data compression process to store a compressed image in the secondary storage unit of only the allocable units of the main memory identified in the record thereby allowing a size of the compressed image to be reduced and a time required to compress and store the compressed image to be minimized. In this embodiment, there is no attempt to optimize compression of the unallocated allocable units prior to storage. Rather, the unallocated allocable units are neither compression-optimized, compressed nor stored.

In a preferred embodiment, the suspend circuit further comprises a circuit for restoring the main memory by decompressing the compressed image into the main memory. The allocable units allocated to the reducing task are designated as unallocated units in the decompressed image. Once the computer system begins to operate again, any tasks then running are free again to request allocable units (including those previously requested merely as read-only units), that can be restored as needed from the secondary storage device.

Once the contents of main memory have been compressed and stored as an image in the secondary storage device, power to the computer system is interrupted. Accordingly, in a preferred embodiment, the computer system further comprises a circuit for discontinuing power to the main memory and, more preferably, to the entirety of the computer system.

As mentioned in the Background of the Invention, it is desirable to initiate power-saving measures only during periods of non-use. Accordingly, in a preferred embodiment, the execution of the reducing task is initiated upon expiration of a preselected period of time. This time may be user-selectable in a conventional manner. Further, one embodiment of the present invention allows for a user to invoke the reducing task at any time to allow the user to shut down the computer system while keeping the user's place.

Although the present invention is applicable to computer systems of all sizes and architectures, including desktop PCs, a preferred environment of the present invention is a portable or notebook PC, owing to the particularly sensitive power limitations associated therewith.

The foregoing has outlined rather broadly the features and technical advantages of the present invention so that those of ordinary skill in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
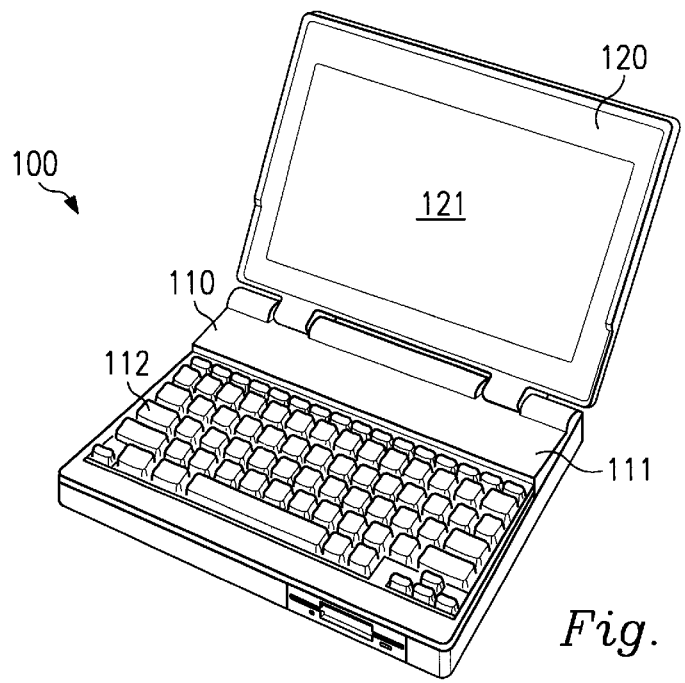
FIG. 1 illustrates a portable PC providing an environment within which the present invention can operate.

FIG. 1 illustrates an isometric view of a portable PC, generally designated 100 providing an environment in which the present invention operates. The portable PC 100 comprises a lower half 110 and an upper half 120. The lower half 110 comprises an outer shell or chassis 111 that contains various, compactly-arranged electronic components of the portable PC 100 and a keyboard 112 allowing a user to transmit information to the portable PC 100. The chassis shields these components (not shown in FIG. 1 because they are internal to chassis 111, but detailed in pertinent part in FIG. 3) from damage by exposure to an environment external to the chassis 111. The upper half 120 contains a video screen or monitor 121 allowing the portable PC 100 to transmit information to the user.

The lower half 110 and the upper half 120 are hinged together so as to allow the lower half 110 and the upper half 120 to rotate relative to each other. This allows the portable PC 100 to assume a closed, storage position wherein the upper and lower halves 110, 120 shield the keyboard 112 and the monitor 121 from damage and wherein the portable PC 100 can be conveniently stored. The portable PC 100 can also assume (as shown) an open, operating position wherein the keyboard 112 and the monitor 121 are exposed to a user for communication therewith. As has been described, power required by the portable PC 100 may be conserved by interrupting power to a secondary storage device or hard disk drive (not shown in FIG. 1, but represented in FIG. 2) within the portable PC 100 and the monitor 121, in turn. The present invention is preferably designed to operate following an extended period of user inactivity (most often determined by sensing keyboard 112 or disk drive inactivity).

Figure 2:
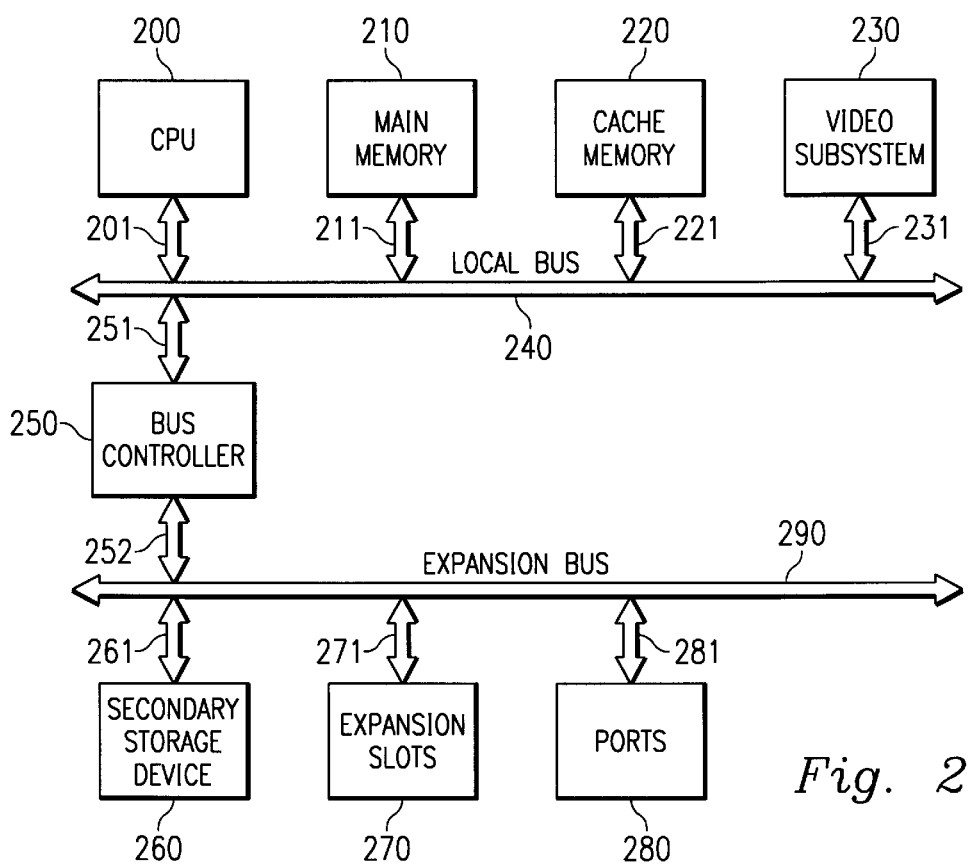
FIG. 2 illustrates a block diagram of an architecture of the portable PC of FIG. 1.

Turning now to FIG. 2, illustrated is a block diagram of an architecture of the portable PC 100 of FIG. 1. A microprocessor CPU 200 is coupled to main memory 210, cache memory 220 and a video subsystem 230 via a relatively fast local bus 240. Communication of data between the local bus 240 and the CPU 200, the main memory 210, the cache memory 220 and the video subsystem 230 is by way of lines 201, 211, 221, 231, respectively.

A bus controller 250 manages communication of data between the relatively fast local bus 240 and a relatively slow expansion bus 290 via lines 251, 252, respectively. The expansion bus 290 couples at least one nonvolatile secondary storage device 260 (such as a floppy, Bernoulli, magneto-optical, CD-ROM or hard disk drive), expansion slots 270 (capable or receiving daughter-cards providing functions such as facsimile or modem, network interface or sound) and ports 280 (for coupling a printer or serial devices to the portable PC 100) via lines 261, 271, 281, respectively. The two-tiered architecture of the portable PC 100 allows for relatively fast communication of data between the most often-used resources: the CPU 200, the memory 210, 220 and the video subsystem 230 and relieves the local bus 240 from supporting less often-used resources, such as the secondary storage device 260. Those ordinarily skilled in the art will understand specific details of the structure and function of the architecture illustrated in FIG. 2.

The present invention is designed to conserve computer power by storing the pertinent contents of the main memory 210 as a compressed image in the nonvolatile secondary storage device 260, allowing power to be interrupted to the portable PC 100 in its entirety. When the user so directs, power is restored to the PC, and the image is decompressed back into the main memory 210, allowing the CPU 200 to continue processing at the point where it stopped prior to interruption of power.

Figure 3:
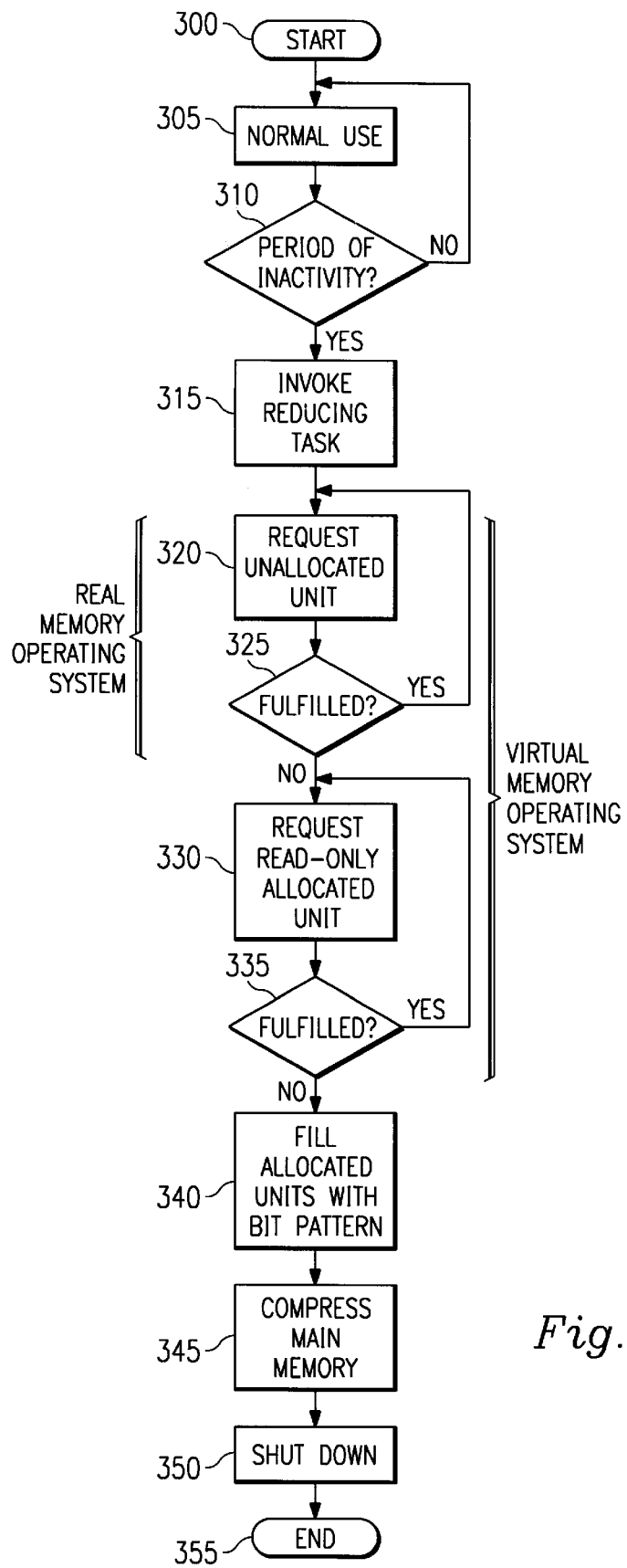
FIG. 3 illustrates a flow diagram of the main memory image compression method (STD) of a first embodiment of the present invention.

Turning now to FIG. 3, illustrated is a flow diagram of a first embodiment of the main memory image compression method (STD) of the present invention. This embodiment features a reducing task that is independent of the underlying operating system. Both the first and second embodiments of the method of the present invention are preferably embodied as a series of instructions for execution in a CPU, such as the Execution begins in a start block 300 wherein the portable PC 100 is started (or "booted") and proceeds to a block 305 wherein the user engages the portable PC 100 in normal use. During normal use, an operating system is loaded into the main memory 210. One of the purposes of the operating system is to allocate resources to tasks (or "application programs," such as word processors, spreadsheets, communications programs, database managers, games and the like and their associated data) as they are executed on the portable PC 100.

For instance, a user loads Microsoft® MS-DOS®, a popular operating system into the main memory 210. MS-DOS® operates with a real memory space and therefore classifies allocable units as either allocated or unallocated. The user next loads WordPerfect®, a popular word processor. The user then loads a document from the hard disk drive and begins adding to the document. As the length of the document grows, WordPerfect makes requests of MS-DOS® to allocate additional units of memory to contain the growing document. For instance, if the portable PC 100 has 640 kilobytes ("K") of random access main memory, divided into 10 allocable units of 64K each, WordPerfect® itself may occupy 6 of the allocable units and the document may occupy 1 of the allocable units, leaving 3 remaining unallocated units. For purposes of this example, it is now assumed that the user leaves the portable PC 100 without saving the document. A period of inactivity thus begins.

A timer within the portable PC 100 functions to measure the period of inactivity. If the period of inactivity exceeds a predetermined maximum length (determined in a decisional block 310), a reducing task is invoked in a block 315. The reducing task optimizes the main memory 210 of FIG. 2 to, in effect, reduce the operating system's working set to minimize the size of the compressed image that is subsequently produced.

The reducing task begins execution by making iterative requests (in a block 320 and a decisional block 325) of the operating system to allocate allocable units or pages of the main memory to the reducing task. To continue the above example, WordPerfect® has a total of 7 allocable units of memory allocated to it (6 for the program and 1 for its data). Therefore, there are 3 unallocated units of memory. Prior art STD routines would simply compress the 3 unallocated units along with the 7 allocated units, no matter that the 3 unallocated units contain useless data. The present invention instead optimizes the 3 unallocated units for subsequent compression, drastically reducing the time and disk space required to store the unallocated units. The reducing task continues (looping through the blocks 320 and 325) until the operating system can no longer fulfill requests for additional allocable units.

As described previously, some operating systems manage a virtual memory space, rather than simply a real memory space. Microsoft® Windows™ and IBM® OS/2® (both virtual memory operating systems) classify allocable units as unallocated, allocated read-only or allocated read-write). Thus, if the user had loaded Windows instead of MS-DOS, some of the 6 units allocated to WordPerfect would have been allocated as read-only units, it not being necessary to modify the program in memory. The 1 unit allocated to the document would have been allocated read-write, and the remaining 3 units would have been designated as unallocated, as before.

The present invention recognizes that it is not necessary to create an image of read-only allocated units, because those units are unmodified and thus already exist on the secondary storage unit. Thus, when the reducing task of the present invention is executing under a virtual memory operating system and once it has requested allocation of the unallocated units (in the blocks 320 and 325), it further makes iterative requests of the operating system to be allocated read-only units (in a block 330 and a decisional block 335).

It is important to note that each operating system responds to a unique request or call to allocate unallocated memory units. Thus, MS-DOS, Windows and OS/2 each require a different call. The present invention contemplates a different version of the reducing task depending upon the operating system with which it is to operate.

An alternative embodiment of the present invention may request re-allocation of either or both of unmodified read-write pages and modified read-write pages prior to proceeding to block 340. It should be understood that the specific implementation regarding which pages of memory are "allocated" to the reducing task may vary depending on the operating environment, and the priorities of speed/efficiency of the suspend-to-disk and resume-from-disk operations.

Once the reducing task has been allocated all of the previously unallocated units (including read-only units in a virtual memory system), execution proceeds to a block 340, wherein the units now allocated to the reducing task are filled with a bit pattern that is chosen to optimize performance of a subsequently-performed compression routine.

There are a wide variety of conventional data compression algorithms that are suitable to compress the contents of main memory to create a compressed image to be stored in the secondary storage device. Those skilled in the art are familiar with standard compression algorithms such as run length encoding, adaptive pattern substitution, variable-length character encoding (such as Huffman coding), restricted variability codes, dictionary substitution, differencing and ordered data schemes. It is important to note that the present invention does not depend upon a particular type of data compression routine. Those skilled in the art will realize that the particular routine chosen is a function of the type and structure of the data stored in the main memory. The present invention is concerned simply with providing a bit pattern that is amenable to the routine so chosen.

For instance, a run length encoding compression algorithm may be chosen wherein repeating characters are compressed by storing a single instance of the repeating character, followed by a numeral representing the number of times the character repeats. If run length encoding is the chosen compression algorithm, then it becomes most advantageous to fill each allocable unit allocated to the reducing task with a bit pattern representing a single, repeating character, such that a compressed image of those units thus filled each consists of a single occurrence of the single character followed by a numeral indicating that the character is repeated 64K times. Thus, the entire contents of a 64K unit of the main memory 210 has been reduced to only a few characters. This represents a dramatic decrease in time and space required to store the compressed image when compared to a unit that has not been so optimized for compression.

After the bit pattern has been stored in each of the reducing task's allocated units, execution proceeds to a block 345, wherein the chosen compression routine is executed and the resulting compressed image of the main memory 210 is stored in the secondary storage device 260. Finally, power to the portable PC 100 is interrupted via any one of a number of conventional means in a block 350 and execution ends in an end block 355.

Figure 4:
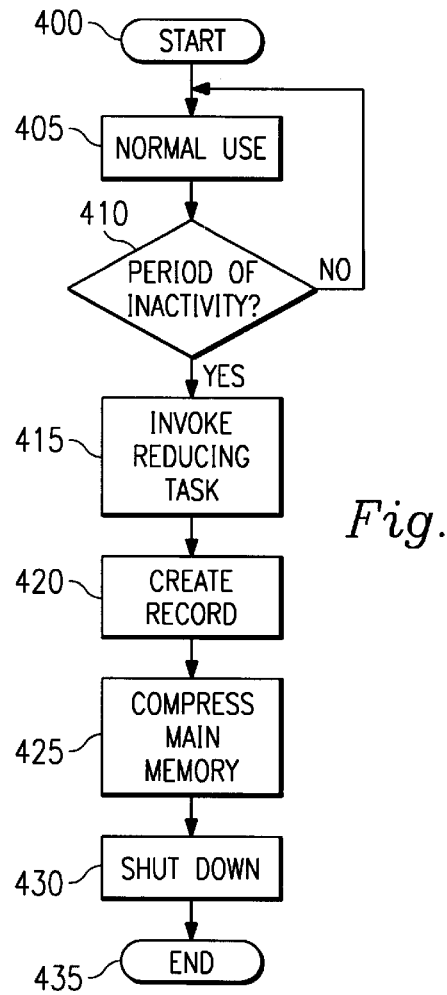
FIG. 4 illustrates a flow diagram of the main memory image compression method (STD) of a second embodiment of the present invention.

Turning now to FIG. 4, illustrated is a flow diagram of the main memory image compression method (STD) of a second embodiment of the present invention. In this embodiment, the unallocated allocable units are neither compression-optimized, compressed nor stored. Thus, neither time nor disk space are wasted in optimization, compression or storage of allocable units that are not important to operation of the PC 100. On the other hand, the reducing task must be tailored to a specific operating system.

As in FIG. 3, execution begins in a start block 400 wherein the portable PC 100 is started (or "booted") and proceeds to a block 405 wherein the user engages the portable PC 100 in normal use. During normal use, an operating system is loaded into the main memory 210. The user again loads an application task and begins to edit a document.

For purposes of this example, it is again assumed that the user leaves the portable PC 100 without saving the document. A period of inactivity thus begins.

A timer within the portable PC 100 functions to measure the period of inactivity. If the period of inactivity exceeds a predetermined maximum length (determined in a decisional block 410), a reducing task is invoked in a block 415. The reducing task again optimizes the main memory 210 of FIG. 2 to, in effect, reduce the operating system's working set to minimize the size of the compressed image that is subsequently produced.

Rather than requesting unallocated memory units as in FIG. 3, the reducing task creates a record containing the identities of any allocable units that have been allocated to tasks (in a block 420), including the word processing task. More specifically, the allocable units are identified by their block or page addresses. If the operating system is a virtual operating system, the record does not include allocable units that have been read-only allocated.

Next, as in FIG. 3, execution proceeds to a block 425, wherein the chosen compression routine is executed and the resulting compressed image of the main memory 210 is stored in the secondary storage device 260. It is important to note that the compression routine employs the record the reducing task created to compress only those allocable units identified in the record. During compression of the main memory, the record containing the identity of the allocable units compressed is also stored for use by the main memory restoration method detailed in FIG. 5. Finally, power to the portable PC 100 is interrupted via any one of a number of conventional means in a block 430 and execution ends in an end block 435.

Figure 5:
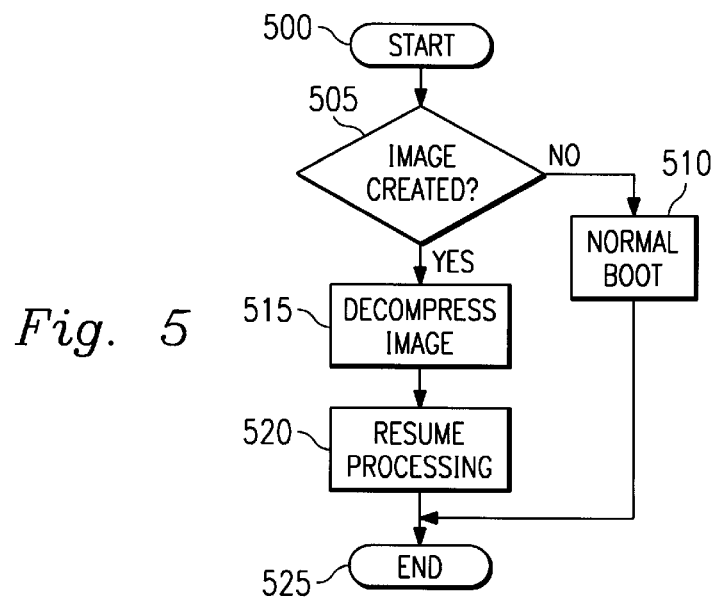
FIG. 5 illustrates a flow diagram of the main memory restoration method (RFD) of the present invention.

Turning now to FIG. 5, illustrated is a flow diagram of the main memory restoration method (RFD) of the present invention. The RFD is invoked when the user takes affirmative action to restore power to the portable PC 100, typically by cycling a power switch thereon.

Execution begins in a start block 500 wherein the portable PC 100 boots, loading initial portions of code commonly stored in nonvolatile memory within the portable PC 100. Execution proceeds to a decisional block 505 wherein it is determined whether or not the reducing task of the portable PC 100 had previously created a compressed image of the main memory 210 on the secondary storage device 260 and had interrupted power. This may be accomplished by detecting a presence of a compressed image file on the secondary storage device 260 or by other conventional means. If no such image exists, then execution proceeds to a block 510 and the portable PC 100 undergoes a conventional boot sequence.

If a compressed image file is detected, execution proceeds to a block 515, wherein a corresponding (e.g., run length decoding) decompression routine decompresses and restores the main memory 210 to the state in which it was prior to shutdown. In the first embodiment, the units previously allocated to the reducing task remain filled with the bit pattern. In the second embodiment, the stored record is retrieved and used as a guide by the decompression routine to restore the compressed allocable units to their proper position in main memory. In both embodiments, those units either allocated (in real memory systems) or allocated read-write (in virtual memory systems) to other tasks are fully restored. Readonly allocated units are restorable in time through conventional retrieval from the secondary storage unit 260. Thus, the main memory 210 has been restored in pertinent part. As a part of the block 515, the units previously allocated to the reducing task are marked as unallocated and therefore free for subsequent allocation by the operating system.

Next, execution proceeds to a block 520, wherein processing is resumed with the portable PC 100 in exactly the same pertinent state as when the user left. Under virtual memory operating systems, some tasks (such as WordPerfect®) may have lost read-only units during operation of the reducing task. However, those tasks are free to request such units to be reallocated over time in a conventional manner, as mentioned before. Eventually, processing terminates in an end block 525.

From the above description, it is apparent that the present invention provides, in a computer system having a CPU, a main memory divisible into allocable units, a secondary storage unit and an operating system for allocating the allocable units to tasks for use thereby, a suspend circuit for creating an optimized compressed image of data in the main memory. The suspend circuit comprises: (1) a circuit for initiating execution of a reducing task on the CPU, the reducing task requesting the operating system to allocate unallocated ones of the allocable units to the reducing task, (2) a circuit for storing a bit pattern in the allocable units allocated to the reducing task, the bit pattern chosen to optimize performance of a data compression process and (3) a circuit for executing the data compression process to store a compressed image of the main memory in the secondary storage unit, the bit pattern allowing a size of the compressed image to be reduced and a time required to compress and store the compressed image to be minimized.

Although the present invention and its advantages have been described in detail, it should be understood that various changes, substitutions and alterations can be made herein without departing from the spirit and scope of the invention as defined by the appended claims. One such alternative would be to invoke the suspend-to-disk operation by means other than upon expiration of a selected period of inactivity, as discussed above with reference to block 310. For example, alternative mechanisms for invoking the reducing task may include a user invoked command, a "hot-key" sequence, an alarm based on a predefined time and date, or an indication that the battery in the computer is almost out of power.

What is claimed is:

1. In a computer system having a central processing unit (CPU), a main memory being divisible into two groups of allocable units with the first group storing data therein, a secondary storage unit and an operating system for allocating said allocable units to tasks for use thereby, a suspend circuit for creating an optimized compressed image of the data into the secondary storage unit, comprising:

a circuit for initiating execution of a reducing task on said CPU, said reducing task requesting said operating system to allocate unallocated ones of said allocable units in the second group to said reducing task;

a circuit for storing a bit pattern of said data into said allocable units allocated to said reducing task, said bit pattern chosen to optimize performance of a data compression process; and a circuit for executing said data compression process to store a compressed image of said bit pattern in said secondary storage unit, said bit pattern allowing a size of said compressed image to be reduced and a time required to compress and store said compressed image to be minimized, wherein said operating system is for allocating said allocable units in said second group to said tasks as a selected one of a read-only allocated unit and a read-write allocated unit, said reducing task further for requesting said task further for requesting said operating system to allocate ones of said read-only allocated allocable units to said reducing task.

2. In a computer system having a central processing unit (CPU), a main memory being divisible into two groups of allocable units with the first group storing data therein, a secondary storage unit and an operating system for allocating said allocable units to tasks for use thereby, a suspend circuit for creating an optimized compressed image of the data into the secondary storage unit, comprising:

a circuit for initiating execution of a reducing task on said CPU, said reducing task requesting said operating system to allocate unallocated ones of said allocable units in the second group to said reducing task:

a circuit for storing a bit pattern of said data into said allocable units allocated to said reducing task, said bit pattern chosen to optimize performance of a data compression process; and a circuit for executing said data compression process to store a compressed image of said bit pattern in said secondary storage unit, said bit pattern allowing a size of said compressed image to be reduced and a time required to compress and store said compressed image to be minimized, wherein said execution of said reducing task is initiated upon expiration of a preselected period of time.

3. The suspend circuit as recited in claim 2 further comprising a circuit for restoring said main memory by decompressing said compressed image into said main memory.

4. The suspend circuit as recited in claim 2 further comprising a circuit for discontinuing power to said main memory.

5. The suspend circuit as recited in claim 2 further comprising a circuit for restoring said main memory by decompressing said compressed image into said main memory, said allocable units allocated to said reducing task designated as unallocated units in said decompressed image.

6. The suspend circuit as recited in claim 2 wherein said computer system is a portable personal computer (PC).

7. The suspend circuit as recited in claim 2 wherein said secondary storage unit is a hard disk drive.

8. The suspend circuit as recited in claim 2 wherein said main memory is a virtual memory space.

9. In a computer system having a central processing unit (CPU), a main memory being divisible into two groups of allocable units with the first group storing data therein, a secondary storage unit and an operating system for allocating said allocable units to tasks for use thereby, a suspend circuit for creating an optimized compressed image of the data into the secondary storage unit, comprising:

a circuit for initiating execution of a reducing task on said CPU, said reducing task requesting said operating system to allocate unallocated ones of said allocable units in the second group to said reducing task;

a circuit for storing a bit pattern of said data into said allocable units allocated to said reducing task, said bit pattern chosen to optimize performance of a data compression process; and a circuit for executing said data compression process to store a compressed image of said bit pattern in said secondary storage unit, said bit pattern allowing a size of said compressed image to be reduced and a time required to compress and store said compressed image to be minimized, wherein said circuit for storing said bit pattern is further for filling said main memory with a repeating plurality of said bit pattern.

10. In a computer system having a main memory divisible into allocable units, a secondary storage unit and an operating system for allocating said allocable units to tasks for use thereby, a method of creating an optimized compressed image of data in said main memory and storing said optimized compressed image in the secondary storage unit, comprising the steps of:

requesting said operating system to allocate unallocated ones of said allocable units to a reducing task, the unallocated ones being separate from a portion of main memory in which the data resides, wherein said operating system is for allocating said allocable units to said tasks as a selected one of a read-only allocated unit and a read-write allocated unit;

storing a bit pattern of the data in at least one of said allocable units allocated to said reducing task, said bit pattern chosen to optimize performance of a data compression process;

executing said data compression process to store a compressed image of said bit pattern into said secondary storage unit, said bit pattern allowing a size of said compressed image to be reduced and a time required to compress and store said compressed image to be minimized; and requesting said operating system to allocate ones of said read-only allocated allocable units to said reducing task.

11. In a computer system having a main memory divisible into allocable units, a secondary storage unit and an operating system for allocating said allocable units to tasks for use thereby, a method of creating an optimized compressed image of data in said main memory and storing said optimized compressed image in the secondary storage unit, comprising the steps of:

requesting said operating system to allocate unallocated ones of said allocable units to a reducing task, the unallocated ones being separate from a portion of main memory in which the data resides;

storing a bit pattern of the data in at least one of said allocable units allocated to said reducing task, said bit pattern chosen to optimize performance of a data compression process; and executing said data compression process to store a compressed image of said bit pattern into said secondary storage unit, said bit pattern allowing a size of said compressed image to be reduced and a time required to compress and store said compressed image to be minimized, wherein said steps of requesting, storing and executing occur upon expiration of a preselected period of time.

12. The method as recited in claim 11 further comprising the step of restoring said main memory by decompressing said compressed image into said main memory.

13. The method as recited in claim 11 further comprising the step of discontinuing power to said main memory following said step of executing.

14. The method as recited in claim 11 further comprising the step of restoring said main memory by decompressing said compressed image into said main memory, said allocable units allocated to said reducing task designated as unallocated units in said decompressed image.

15. The method as recited in claim 11 wherein said computer system is a portable personal computer (PC).

16. The method as recited in claim 11 wherein said secondary storage unit is a hard disk drive.

17. The method as recited in claim 11 wherein said main memory is a virtual memory space.

18. In a computer system having a main memory divisible into allocable units, a secondary storage unit and an operating system for allocating said allocable units to tasks for use thereby, a method of creating an optimized compressed image of data in said main memory and storing said optimized compressed image in the secondary storage unit, comprising the steps of:

requesting said operating system to allocate unallocated ones of said allocable units to a reducing task, the unallocated ones being separate from a portion of main memory in which the data resides;

storing a bit pattern of the data in at least one of said allocable units allocated to said reducing task, said bit pattern chosen to optimize performance of a data compression process, wherein said step of storing comprises the step of filling said main memory with a repeating plurality of said bit pattern; and executing said data compression process to store a compressed image of said bit pattern into said secondary storage unit, said bit pattern allowing a size of said compressed image to be reduced and a time required to compress and store said compressed image to be minimized.

19. A suspend circuit for creating an optimized compressed image of an allocated portion of main memory of a computer system in an associated nonvolatile secondary storage device to allow said computer system to enter a mode of reduced power consumption, comprising:

a reducing task for execution in a central processing unit (CPU) of said computer system, said reducing task iteratively requesting an operating system of said computer system to allocate unallocated units of said main memory to said reducing task;

a circuit for filling at least one of said units allocated to said reducing task with a bit pattern of said allocated portion, said bit pattern chosen to optimize performance of a data compression process;

a circuit for executing said data compression process to create said compressed image and store said compressed image on said secondary storage device, said data compression process compressing said at least one units filled with said bit pattern to a minimal size to thereby allow said compressed image to be reduced in overall size and to minimize a time required to compress and store said compressed image; and a circuit for discontinuing power to said main memory to enter said mode of reduced power consumption, wherein said operating system is for allocating said allocable units to tasks as a selected one of a read-only allocated unit and a read-write allocated unit, said reducing task further for requesting said operating system to allocate ones of said read-only allocated allocable units to said reducing task.

20. A suspend circuit for creating an optimized compressed image of an allocated portion of main memory of a computer system in an associated nonvolatile secondary storage device to allow said computer system to enter a mode of reduced power consumption, comprising:

a reducing task for execution in a central processing unit (CPU) of said computer system, said reducing task iteratively requesting an operating system of said computer system to allocate unallocated units of said main memory to said reducing task;

a circuit for filling at least one of said units allocated to said reducing task with a bit pattern of said allocated portion, said bit pattern chosen to optimize performance of a data compression process;

a circuit for executing said data compression process to create said compressed image and store said compressed image on said secondary storage device, said data compression process compressing said at least one units filled with said bit pattern to a minimal size to thereby allow said compressed image to be reduced in overall size and to minimize a time required to compress and store said compressed image; and a circuit for discontinuing power to said main memory to enter said mode of reduced power consumption, wherein reducing task executes upon expiration of a preselected period of time.

21. The suspend circuit as recited in claim 20 further comprising a circuit for restoring said main memory by decompressing said compressed image into said main memory.

22. The suspend circuit as recited in claim 20 further comprising a circuit for discontinuing power to said nonvolatile secondary storage device following said discontinuing of power to said main memory.

23. The suspend circuit as recited in claim 20 further comprising a circuit for restoring said main memory by decompressing said compressed image into said main memory, said allocable units allocated to said reducing task designated as unallocated units in said decompressed image.

24. The suspend circuit as recited in claim 20 wherein said computer system is a portable personal computer (PC).

25. The suspend circuit as recited in claim 20 wherein said operating system is a virtual memory operating system.

26. The suspend circuit as recited in claim 20 wherein said nonvolatile secondary storage unit is a hard disk drive.

27. The suspend circuit as recited in claim 20 wherein said main memory is a virtual memory space.

28. A method of creating an optimized compressed image of an allocated portion of main memory of a computer system in an associated nonvolatile secondary storage device to allow said computer system to enter a mode of reduced power consumption, comprising the steps of:

executing a reducing task in a central processing unit (CPU) of said computer system, said reducing task iteratively requesting an operating system of said computer system to allocate unallocated units of said main memory to said reducing task;

filling at least one of said units allocated to said reducing task with a bit pattern, said bit pattern of said allocated portion chosen to optimize performance of a data compression process;

executing said data compression process to create said compressed image and store said compressed image on said secondary storage device, said data compression process compressing said at least one unit filled with said bit pattern to a minimal size to thereby allow said compressed image to be reduced in overall size and to minimize a time required to compress and store said compressed image;

discontinuing power to said main memory to enter said mode of reduced power consumption, wherein said operating system is for allocating said allocable units to tasks as a selected one of a read-only allocated unit and a read-write allocated unit; and requesting said operating system to allocate ones of said read-only allocated allocable units to said reducing task.

29. A method of creating an optimized compressed image of an allocated portion of main memory of a computer system in an associated nonvolatile secondary storage device to allow said computer system to enter a mode of reduced power consumption, comprising the steps of:

executing a reducing task in a central processing unit (CPU) of said computer system, said reducing task iteratively requesting an operating system of said computer system to allocate unallocated units of said main memory to said reducing task, wherein said step of executing said reducing task occurs upon expiration of a preselected period of time;

filling at least one of said units allocated to said reducing task with a bit pattern, said bit pattern of said allocated portion chosen to optimize performance of a data compression process;

executing said data compression process to create said compressed image and store said compressed image on said secondary storage device, said data compression process compressing said at least one unit filled with said bit pattern to a minimal size to thereby allow said compressed image to be reduced in overall size and to minimize a time required to compress and store said compressed image; and discontinuing power to said main memory to enter said mode of reduced power consumption.

30. The method as recited in claim 29 further comprising the step of restoring said main memory by decompressing said compressed image into said main memory.

31. The method as recited in claim 29 further comprising the step of discontinuing power to said nonvolatile secondary storage device following said step of discontinuing power to said main memory.

32. The method as recited in claim 29 further comprising the step of restoring said main memory by decompressing said compressed image into said main memory, said allocable units allocated to said reducing task designated as unallocated units in said decompressed image.

33. The method as recited in claim 29 wherein said computer system is a portable personal computer (PC).

34. The method as recited in claim 29 wherein said operating system is a virtual memory operating system.

35. The method as recited in claim 29 wherein said nonvolatile secondary storage unit is a hard disk drive.

36. The method as recited in claim 29 wherein said main memory is a virtual memory space.

37. A suspend circuit for creating an optimized compressed image of an allocated portion of main memory of a personal computer (PC) in an associated nonvolatile hard disk drive to allow said PC to enter a mode of reduced power consumption, comprising the steps of:

a reducing task for execution upon expiration of a preselected period of time in a central processing unit (CPU) of said computer system, said reducing task iteratively requesting an operating system of said computer system to allocate unallocated units of said main memory to said reducing task;

a circuit for filling at least a portion of said units allocated to said reducing task with a bit pattern of said allocated portion, said bit pattern chosen to optimize performance of a data compression process;

a circuit for executing said data compression process to create said compressed image and store said compressed image on said hard disk drive, said data compression process compressing said bit pattern to a minimal size to thereby allow said compressed image to be reduced in overall size and to minimize a time required to compress and store said compressed image;

a circuit for discontinuing power to said main memory to enter said mode of reduced power consumption;

a circuit for discontinuing power to said hard disk drive; and a circuit for restoring said main memory by decompressing said compressed image from said hard disk drive into said main memory, wherein said operating system is for allocating said allocable units to tasks as a selected one of a read-only allocated unit and a read-write allocated unit, said reducing task further for requesting said operating system to allocate ones of said read-only allocated allocable units to said reducing task.

38. The suspend circuit as recited in claim 37 wherein said allocable units allocated to said reducing task are designated as unallocated units in said decompressed image upon restoration of said main memory.

39. The suspend circuit as recited in claim 37 wherein said operating system is a virtual memory operating system.

40. The suspend circuit as recited in claim 37 wherein said main memory is a virtual memory space.

41. A method of creating an optimized compressed image of a main memory of a personal computer (PC) in an associated nonvolatile hard disk drive to allow said PC to enter a mode of reduced power consumption, comprising the steps of:

executing a reducing task upon expiration of a preselected period of time in a central processing unit (CPU) of said PC, said reducing task iteratively requesting an operating system of said computer system to allocate unallocated units of said main memory to said reducing task;

filling at least a portion of said units allocated to said reducing task with a bit pattern, said bit pattern chosen to optimize performance of a data compression process;

executing said data compression process to create said compressed image and store said compressed image on said hard disk drive, said data compression process compressing said bit pattern to a minimal size to thereby allow said compressed image to be reduced in overall size and to minimize a time required to compress and store said compressed image; and discontinuing power to said main memory to enter said mode of reduced power consumption;

discontinuing power to said nonvolatile hard disk drive; and restoring said main memory by decompressing said compressed image into said main memory.

42. The method as recited in claim 41 wherein said operating system is for allocating said allocable units to tasks as a selected one of a read-only allocated unit and a read-write allocated unit and said method further comprises the step of:

requesting said operating system to allocate ones of said read-only allocated allocable units to said reducing task.

43. The method as recited in claim 41 further comprising the step of designating said allocable units allocated to said reducing task as unallocated units in said decompressed image following said step of restoring.

44. The method as recited in claim 41 wherein said operating system is a virtual memory operating system.

45. The method as recited in claim 41 wherein said main memory is a virtual memory space.

46. In a computer system having a central processing unit (CPU), a main memory divisible into allocable units, a secondary storage unit and an operating system for allocating said allocable units to tasks for use thereby, a suspend circuit for creating and storing an optimized compressed image of data in said main memory, comprising:

a circuit for initiating execution of a reducing task on said CPU, said reducing task creating a record containing identities of said allocable units allocated for use by said tasks; and a circuit for executing a data compression process to store a compressed image in said secondary storage unit of only said allocable units of said main memory identified in said record, thereby allowing a size of said compressed image to be optimized.

47. The suspend circuit as recited in claim 46 wherein said operating system is for allocating said allocable units to said tasks as a selected one of a read-only allocated unit and a read-write allocated unit, said record free of identities of said read-only allocated units allocated for use by said tasks.

48. The suspend circuit as recited in claim 46 further comprising a circuit for restoring said main memory by decompressing said compressed image into said main memory.

49. The suspend circuit as recited in claim 46 further comprising a circuit for discontinuing power to said main memory.

50. The suspend circuit as recited in claim 46 wherein said execution of said reducing task is initiated upon expiration of a preselected period of time.

51. The suspend circuit as recited in claim 46 further comprising a circuit for restoring said main memory by decompressing said compressed image into said main memory.

52. The suspend circuit as recited in claim 46 wherein said computer system is a portable personal computer (PC).

53. The suspend circuit as recited in claim 46 wherein said record contains an address of said allocable units allocated for use by said tasks.

54. The suspend circuit as recited in claim 46 wherein said secondary storage unit is a hard disk drive.

55. The suspend circuit as recited in claim 46 wherein said main memory is a virtual memory space.

56. In a computer system having a main memory divisible into allocable units, a secondary storage unit and an operating system for allocating said allocable units to tasks for use thereby, a method of creating and storing an optimized compressed image of data in said main memory, comprising the steps of:

creating a record containing identities of said allocable units allocated for use by said tasks with a reducing task; and executing a data compression process to store a compressed image in said secondary storage unit of only said allocable units of said main memory identified in said record thereby allowing a size of said compressed image to be optimized.

57. The method as recited in claim 56 wherein said operating system is for allocating said allocable units to said tasks as a selected one of a read-only allocated unit and a read-write allocated unit and said method further comprises the step of:

freeing said record of identities of said read-only allocated units allocated for use by said tasks.

58. The method as recited in claim 56 further comprising the step of restoring said main memory by decompressing said compressed image into said main memory.

59. The method as recited in claim 56 further comprising the step of discontinuing power to said main memory following said step of executing.

60. The method as recited in claim 56 wherein said steps of requesting, storing and executing occur upon expiration of a preselected period of time.

61. The method as recited in claim 56 further comprising the step of restoring said main memory by decompressing said compressed image into said main memory.

62. The method as recited in claim 56 wherein said computer system is a portable personal computer (PC).

63. The method as recited in claim 56 wherein said step of creating comprises the step of storing an address of said allocable units allocated for use by said tasks in said record.

64. The method as recited in claim 56 wherein said secondary storage unit is a hard disk drive.

65. The method as recited in claim 56 wherein said main memory is a virtual memory space.

* * * * *